United States Patent [19]

Harriman et al.

[11] Patent Number: 5,990,913
[45] Date of Patent: Nov. 23, 1999

[54] METHOD AND APPARATUS FOR IMPLEMENTING A FLUSH COMMAND FOR AN ACCELERATED GRAPHICS PORT DEVICE

[75] Inventors: David J. Harriman, Sacramento; Brian K. Langendorf, El Dorado Hills, both of Calif.

[73] Assignee: Intel Corporation, Santa Clara, Calif.

[21] Appl. No.: 08/902,825

[22] Filed: Jul. 30, 1997

[51] Int. Cl.[6] .................................................. G06F 13/16
[52] U.S. Cl. ...................... 345/521; 345/521; 345/522; 345/501; 345/507; 395/825; 395/844
[58] Field of Search .................................. 345/521, 522, 345/507, 501; 395/376, 561, 825, 844–845

[56] References Cited

U.S. PATENT DOCUMENTS

| | | | |
|---|---|---|---|
| 5,283,899 | 2/1994 | Cook et al. ............................. | 395/672 |
| 5,428,754 | 6/1995 | Baldwin ................................. | 395/561 |
| 5,790,822 | 8/1998 | Sheaffer et al. ....................... | 395/380 |
| 5,812,789 | 9/1998 | Diaz et al. ......................... | 395/200.77 |
| 5,835,783 | 11/1998 | Grimsrud ............................... | 395/828 |

*Primary Examiner*—Kee M. Tung
*Assistant Examiner*—Sy D. Luu
*Attorney, Agent, or Firm*—Blakely, Sokoloff, Taylor & Zafman LLP

[57] ABSTRACT

A system and method for ensuring the execution of commands is visible throughout that system. A flush command is received and enqueued in a first queue together with a synchronization value enqueued in a second queue. The flush command is delayed from being dequeued from the first queue until both the flush command and the synchronization value are advanced to the head of their respective queues. Thereafter, the flush command is dequeued subsequently causing the return of a quad-word of random data as an acknowledge signal.

22 Claims, 10 Drawing Sheets

METHOD AND APPARATUS FOR IMPLEMENTING A FLUSH COMMAND FOR AN ACCELERATED GRAPHICS PORT DEVICE

BACKGROUND OF THE INVENTION

1. Field of the Invention

The present invention relates to the field of data coherency. More particularly, the present invention relates to a system and method for ensuring that data coherency is maintained for transactions through an Accelerated Graphics Port (AGP) interface.

2. Art Related to the Invention

For a number of years, personal computers (PCs) have maintained system-wide data coherency in part through reliance on a particular memory access protocol adopted by conventional architectures of its bridge and input/output bus such as a Peripheral Component Interconnect (PCI) bus. For example, a bridge (e.g., 82430FX™ produced by Intel Corporation of Santa Clara, Calif.) is a chipset which interconnects various devices such as a processor, main memory, and the PCI bus. This bridge is implemented with general mechanisms to guarantee data coherency by loading the contents of its internal buffers to main memory in response to various events. In addition, the PCI bus is a "connected transaction" bus because it follows a bus ownership protocol that ensures a pending transaction is completed before another transaction begins. These transactions may be issued from any agent capable of gaining ownership of the PCI bus, including a graphics subsystem having a graphics controller coupled to both the PCI bus and a limited amount of dedicated graphic controller (GC) memory.

The graphics subsystem is responsible for rendering perspective views of a scene for display. Normally, objects in a three-dimensional (3D) scene are represented as polygons having bitmaps applied to their surfaces. Such bitmaps are referred to as "texture maps" because they are used to give a sense of texture to these polygonal objects. Since each 3D scene has a substantially large number of different perspective views, it is impractical to store all of these perspective views. Instead, by applying texture maps to various polygons within the scene, reshaping the polygons and remapping the texture maps to the polygons as the perspective view of the viewer changes, it becomes possible to render perspective views of the 3D scene in real-time.

Usually, texture maps and other information utilized by the graphics controller are commonly stored in main memory due to cost constraints and the fact that the majority of application programs running on PCs do not require a large amount of dedicated GC memory. As a result, the processor normally is responsible for either transferring data between the graphics controller and main memory over the PCI bus or setting up a direct memory access (DMA) operations between the graphics controller and main memory via the PCI bus.

Recently, it has been discovered that the PCI bus is poorly-suited for supporting graphics operations. The reason is that rendering usually requires repeated access to small portions of a texture mapping. In contrast, PCI-based graphics controllers are currently performing multiple bulk data transfers in order to load an entire texture mapping into its GC memory, even though only a particular portion of the texture mapping is desired. Thus, overall system performance is greatly reduced. In addition, for dynamic image rendering, image quality is sacrificed because the amount of texture mapping that can be stored in GC memory is restricted.

SUMMARY OF THE INVENTION

A system and method for ensuring data coherency. In one embodiment, the method includes receiving a flush command. Next, the flush command is queued in a first queue while a synchronization value enqueued in a second queue. Thereafter, the flush command is delayed from being dequeued from the first queue until the flush command is present at the head of the first queue and the synchronization value is advanced to the head of the second queue. In sum, this guarantees that prior commands are visible to the system before the flush command is dequeued.

BRIEF DESCRIPTION OF THE DRAWINGS

The present invention is illustrated by way of example and not limitation in the figures of the accompanying drawings in which like references indicate similar elements and in which.

DESCRIPTION OF THE PREFERRED EMBODIMENT

The present invention describes a system and method for maintaining data coherency for an electronic system utilizing an Accelerated Graphics Port (AGP) interface. This may be accomplished by ensuring that certain low-priority transactions are completed and new resulting data is accessible (i.e., visible) to any agent of the electronic system capable of issuing transactions. Examples of agents may include a graphics controller, processor and the like. Although certain illustrative embodiments are described below in order to convey the spirit and scope of the present invention, such embodiments should not be construed as a limitation on the scope of the present invention.

Moreover, various terms are used herein to describe certain architecture or characteristics of the present invention. For example, a "communication line" is also broadly defined as any information-carrying medium (e.g., one or more electrical wires, bus traces, fiber optics, infrared or radio frequency signaling, etc.). A "subsystem" includes a single integrated circuit (IC) device or multiple IC devices operating collectively. These IC devices may be encased within a single or multi-chip IC package, mounted on a common substrate such as a daughter card, or mounted on different substrates interconnected by a common substrate or a communication line. A "chipset" is a collection of integrated circuits operating as a collective unit.

Similarly, the term "information" is broadly defined as data, and/or address, and/or control. The term "visible" (and related tenses) is defined as a state where a result from a second operation is consistent with a previous first operation having been performed such that the first operation is visible to an agent which initiated the second operation. For example, with respect to write operations, the term "visible" may be construed as a state where any agent (e.g., processor (s), graphics controller(s), etc.) has access to new data whether stored in main memory or any other temporary storage device. The term "enqueue" (and related tenses) is defined as loading information into an entry of a queue. In contrast, the term "dequeue" (and related tenses) is defined as removing information from a queue.

Figure 1:
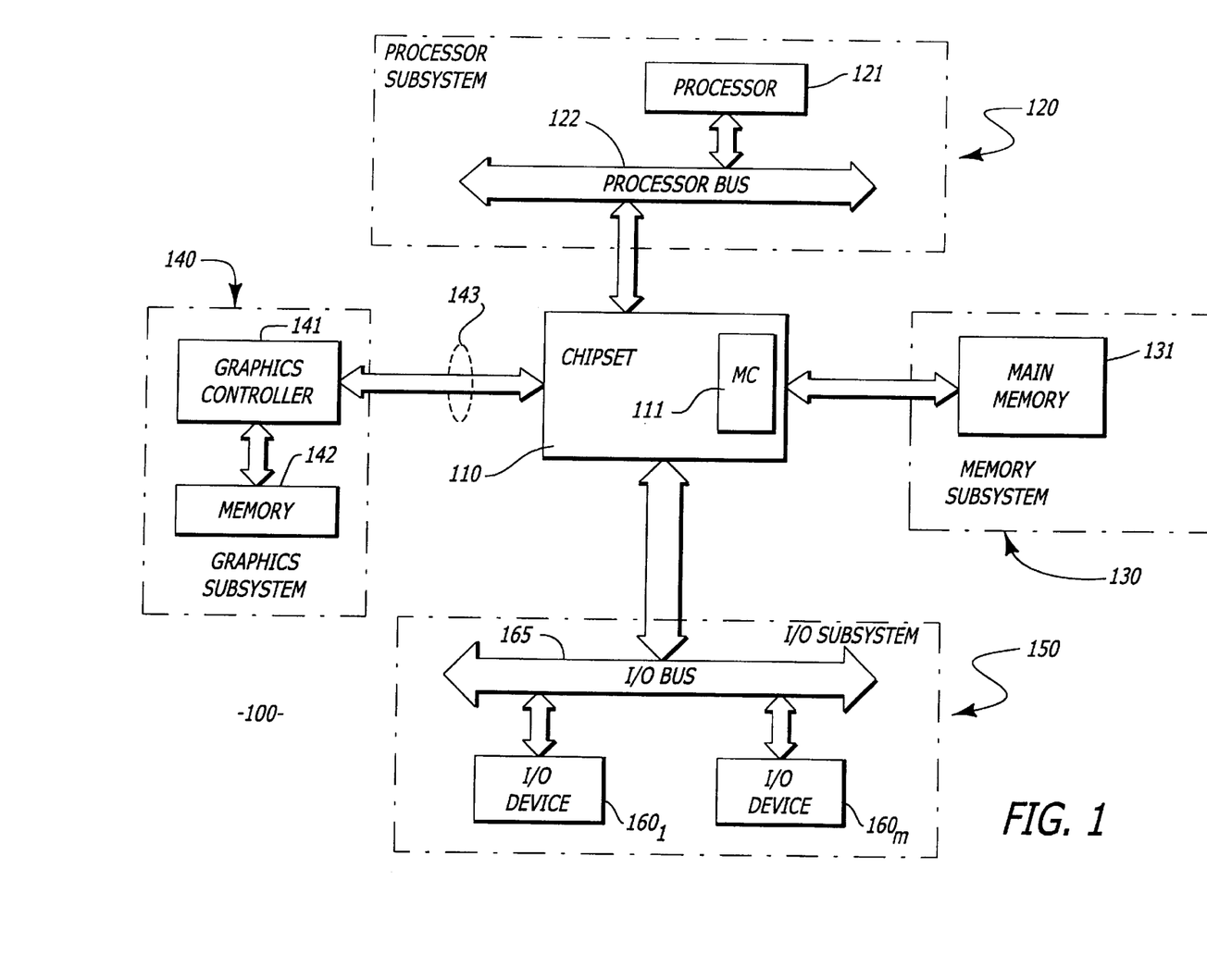
FIG. 1 is an illustrative embodiment of a computer architecture in which the present invention may be implemented.

Referring now to FIG. 1, an illustrative embodiment of an electronic system 100 featuring the present invention is shown. The electronic system 100 includes a chipset 110 coupled to a processor subsystem 120, a memory subsystem 130, a graphics subsystem 140, and an input/output (I/O) subsystem 150. The chipset 110 includes logic circuitry to control the routing of information between any of these subsystem 120, 130, 140 and 150. The logic circuitry includes a memory controller (MC) 111 which controls access to main memory 131 of memory subsystem 130. Preferably, main memory 131 may include volatile memory (e.g., dynamic random access memory "DRAM") but may further include non-volatile memory in the alternative or in combination with volatile memory. Examples of non-volatile memory include, but are not limited or restricted to Read Only Memory (ROM), Erasable Programmable Read Only Memory (EPROM), Electrically Erasable Programmable Read Only Memory (EEPROM) or Flash.

As shown in this embodiment, processor subsystem 120 includes at least one processor 121 coupled to a processor bus 122. The processor 121 is in communication with the memory controller 111 of chipset 110. The processor 121 issues memory read and write request signals to memory controller 111 which, in response, writes and reads targeted address locations in main memory 131, graphics subsystem 140, and/or targeted I/O devices $160_1$–$160_m$ of I/O subsystem 150. The processor 121 further issues I/O write and read signals to memory controller 111 which, in turn, transfers the I/O write and read signals to graphics subsystem 140 or I/O devices $160_1$–$160_m$ of I/O subsystem 150 via an I/O bus (e.g., a Peripheral Component Interconnect "PCI" bus) 165. The I/O devices $160_1$–$160_m$ ("m" is a positive whole number) may include any addressable device supporting the functionality of electronic system 100. For example, if electronic system 100 is a general purpose computer, I/O devices $160_1$–$160_m$ would typically include input devices such as a keyboard and cursor control device (e.g., mouse, touchpad, track ball, joystick, etc.), a mass storage device such as magnetic and/or optical disk drive, and a transceiver device such as a modem and/or an area network card.

As further shown in FIG. 1, graphics subsystem 140 includes a graphics controller 141 and dedicated, low-latency memory 142 situated in close proximity to graphics controller 141. The graphics controller 141 has direct access to this dedicated graphics controller memory 142 and also has access to main memory 131 via an accelerated graphics port (AGP) interface 143 in communication with memory controller 111. Graphics controller 141 typically includes one or more processors to perform graphics computations and to output information to a display device (not shown). The AGP interface 143 includes a data path and command path through which graphics controller 141 may achieve relatively low-latency access to main memory 131. According to a specification entitled "Accelerated Graphics Port Interface Specification Revision 1.0" (hereinafter the "AGP specification"), published by Intel Corporation of Santa Clara, Calif. the AGP interface 143 enables graphics controller 141 to interface directly with memory controller 111 instead of through PCI bus 165. This removes the need for graphics controller 141 to arbitrate with other agents for control of PCI bus 165, and thus, lowers the overall memory access latency.

The AGP specification also describes a relaxed memory access protocol in which low-priority read operations and write operations may be reordered with respect to one another in order to optimize the data transfer rate to and from main memory 131. More specifically, for a given sequence of read and write commands issued by graphics controller 141 and executed by a memory controller 111, the following rules apply:

1. Read commands may be executed out of order with respect to other read commands so long as the data ultimately returned to the graphics controller is ordered according to the original read command sequence.
2. Write commands may be executed out of order with respect to other write commands except that a write command may not be reordered for execution ahead of another write command that references the same memory address.
3. Read commands may be executed out of order with respect to write commands and write commands may be executed out of order with respect to read commands except that a read command may not be reordered for execution ahead of a write command that references the same memory address.

Although performance benefits are achieved by virtue of the relaxed memory access policy (e.g., by producing higher page hit rates to improve memory access time), it is occasionally necessary to guarantee that all reads and writes issued by the graphics subsystem over the AGP interface prior to some point in time may be made visible to other devices in the system. Namely, a read operation by other devices will receive new data produced by write operations and that write operations by other devices will not effect the data returned for a read operation. This is referred to as performing a "flush" operation to ensure that AGP-related transactions are "visible" to agents (e.g., subsystems 120, 140 and 150) throughout the electronic system 100 so that newly modified data is accessible.

According to one embodiment of the present invention, a flush command is enqueued within a first command queue within memory controller 111. In the event that memory controller 111 contains multiple command queues, a synchronization value (or sometimes referred to as a "token") is enqueued in each of the other command queue(s). This ensures that any command(s) placed in the command queue (s) prior to the flush command is (are) completed before the flush command is dequeued. This is accomplished by delaying the flush command from being dequeued until the synchronization value(s) is (are) advanced to the respective head(s) of the other command queue(s).

It should be appreciated that while electronic system 100 is depicted as a multiple-bus architecture in which the processor 120 is the sole central processing unit (CPU), alternate bus arrangements and additional CPUs may be employed without departing from the spirit and scope of the present invention.

Figure 2:
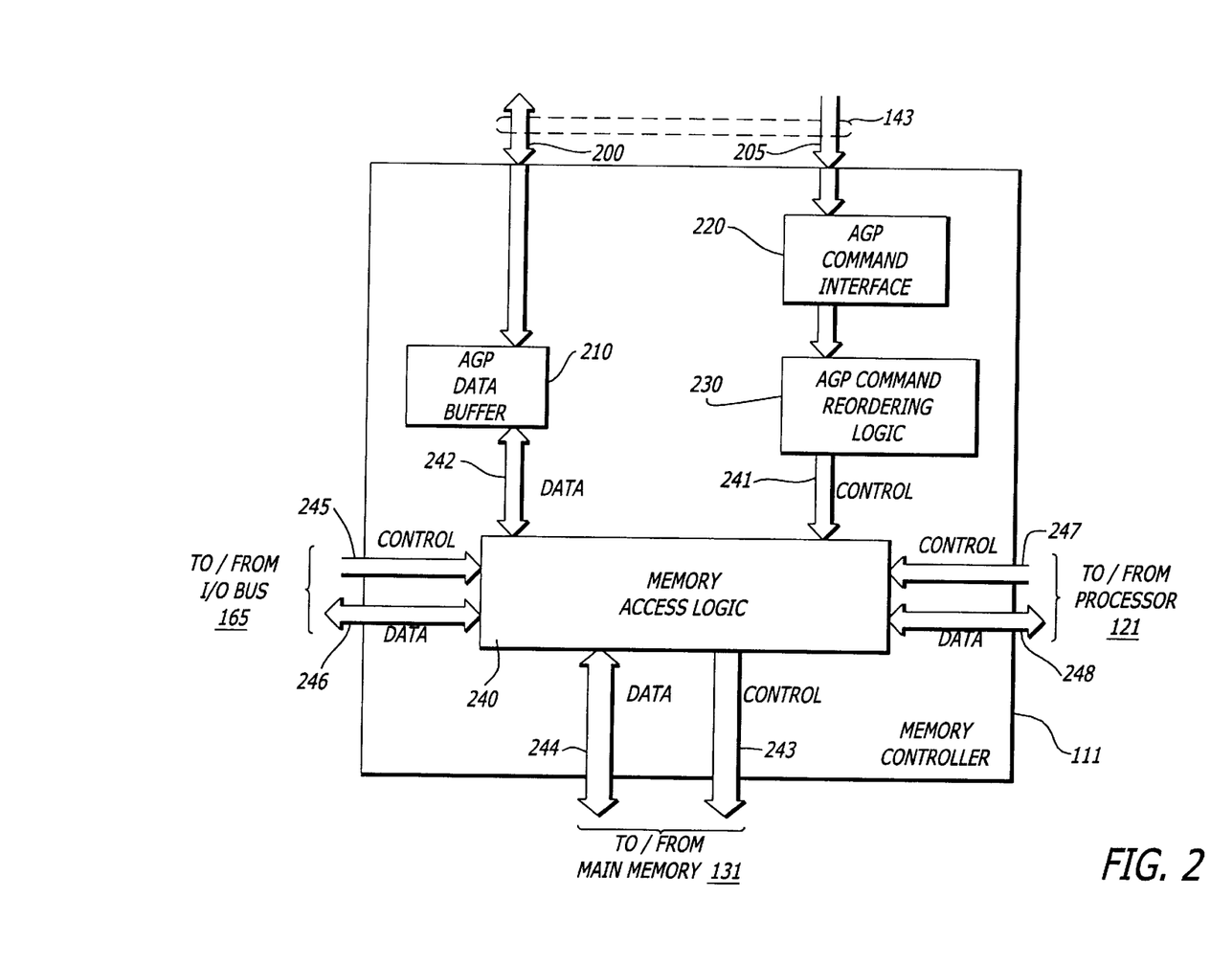
FIG. 2 is an illustrative embodiment of a memory controller of FIG. 1 for the present invention.

Referring now to FIG. 2, one embodiment of memory controller 111 of FIG. 1 is shown. Memory controller 111 is in communication with information transmitted through AGP interface 143 which has both an AGP data path 200 and an AGP command path 205 since AGP interface 143 supports split transactions (requests separate from data transfers). The AGP data path 200 is configured to transfer data to and from AGP data buffer 210. The AGP command path 205 is configured to deliver one or more executable commands to AGP command interface 220. An "executable command" refers to any command or other value (except a synchronization value) for which a command queue entry is allocated. Examples of an executable command may include, but is not limited or restricted to a memory read command, a memory write command or a flush command. Herein, memory read commands and memory write commands are referred to generically as "memory access commands".

As shown in FIG. 2, memory access commands are passed from AGP command interface 220 to an AGP command reordering logic 230 where they are reordered for execution according to various optimization strategies. The reordered memory access commands are then output as control signals to memory access logic 240. Memory access logic 240 receives the control signals from the AGP command reordering logic 230 via communication line 241 and, if the control signals indicate a memory write operation, receives the data to be written from AGP data buffer 210 via communication line 242. If the control signals from AGP command reordering logic 230 indicate a memory read operation, memory access logic 240 performs the read operation on main memory and outputs that data to AGP data buffer 210 via communication lines 243–244. Although communication lines 243–244 usually are shown as unidirectional, it is contemplated that these lines may be implemented as bidirectional or multiplexed communication mediums.

In the event that the control signals from AGP command reordering logic 230 indicate a flush command, possibly through assertion of a dedicated control signal of communication line 241, memory access logic 240 detects the flush command and may respond in accordance with a number of possible response techniques. For example, upon detecting the flush command, memory access logic 240 may disregard accessing main memory as done for conventional read commands. Rather, memory access logic 240 generates an acknowledge signal for transmission via AGP data path 200 allowing error condition and warning operations from being performed. In one embodiment, this acknowledge signal may be represented as a quad-word (8 bytes) of random data loaded into AGP buffer 210 via communication line 242 and subsequently routed through AGP interface 143. More particularly, the protocol adapted by AGP interface 143 requires a quad-word be returned to the graphics controller 141 to indicate that the flush has completed. This quad-word may either be generated by the memory access logic or by the AGP interface. The 82440LX™ PCI chipset produced by Intel Corporation has the memory access logic generating the quad-word. In another embodiment, this acknowledge signal may be a control signal transmitted directly to logic circuitry within the chipset 110, perhaps other AGP interface logic (not shown), in order to produce one or more data bits to represent an acknowledge signal.

In addition to receiving signals from AGP data buffer 210 and AGP command reordering logic 230, memory access logic 240 is also coupled to receive control signals from I/O bus 165 and the processor bus 121 via respective communication lines 245 and 247, and to receive or output data on the I/O bus 165 and the processor bus 121 via communication lines 246 and 248, respectively. Memory access logic 240 is further capable of outputting memory access control signals to main memory 131 and transferring information to and from main memory 131, with the exception of the flush command. For main memory 131 formed with DRAM, the typical memory access control signals output by memory access logic 240 would include at least row and column address strobe signals and a write enable signal. If other memory types are used to implement main memory 130, different memory access control signals may be necessary.

Figure 3A:
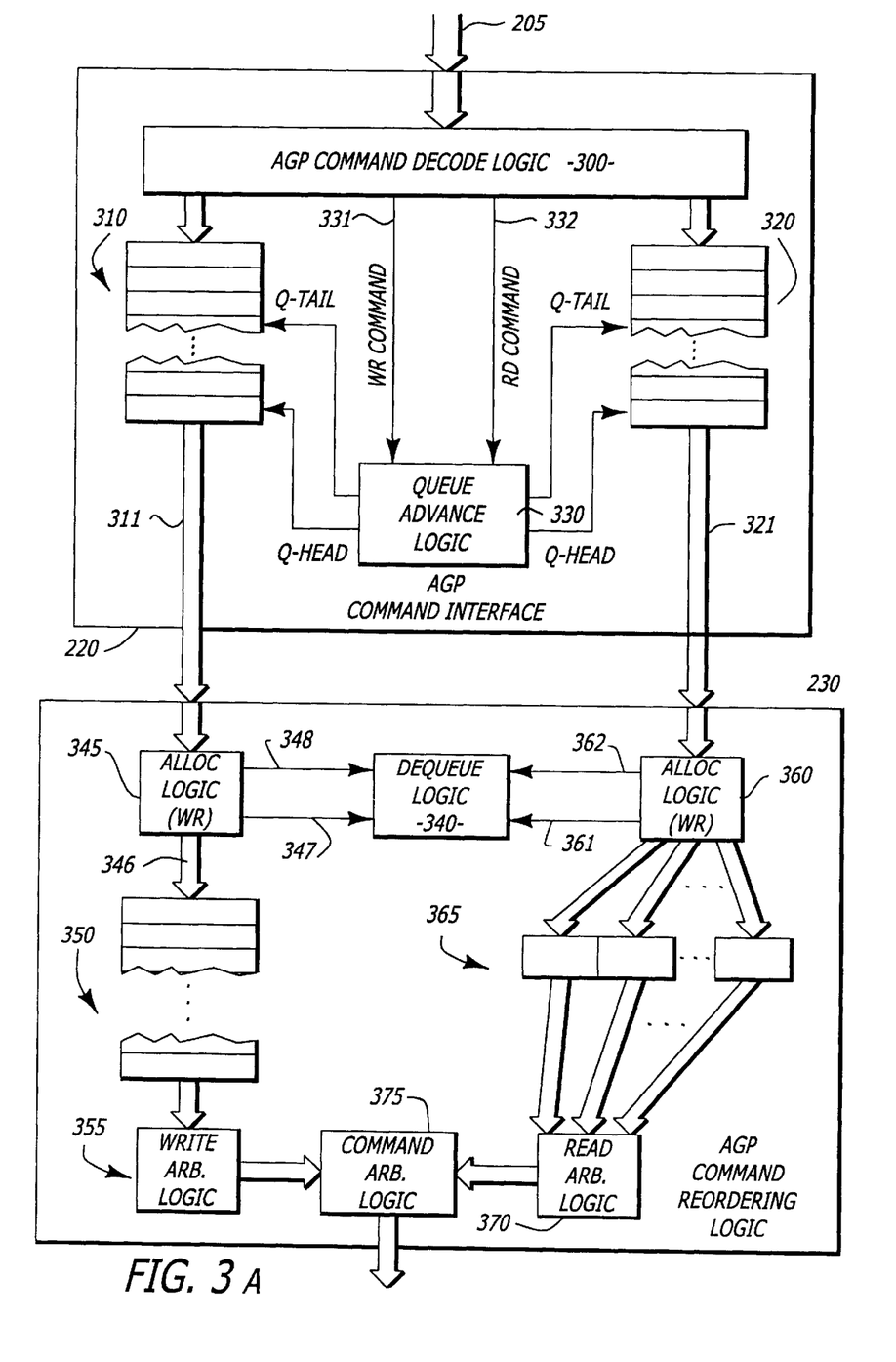
FIG. 3A is an illustrative embodiment of a command interface and command reordering logic according to one embodiment of the present invention.

Referring to FIG. 3A, an illustrative embodiment of AGP command interface 220 and AGP command reordering logic 230 is shown. AGP command interface 220 includes AGP command decode logic 300, a write command queue 310, a read command queue 320 and queue advance logic 330. Memory access commands are received in the AGP command decode logic 300 via the AGP command path 205. The AGP command decode logic 300 decodes these commands to determine whether they are write commands or read commands and then enters the commands into either the write command queue 310 or the read command queue 320 accordingly. These separate command queues for memory write and read commands allow the write and read commands to be reordered relative to one another pursuant to the relaxed memory access protocol.

The AGP command decode logic 300 asserts a pair of control signals on communication lines 331 and 332, labeled "WR CMD" and "RD CMD," to queue advance logic 330 indicating that either a write command or a read command should be enqueued. Upon receiving a control signal to enqueue a write command or a read command, queue advance logic 330 adjusts a queue tail (Q-TAIL) to point to the next entry in the write command queue 310 or the read command queue 320, respectively, and the indicated command is stored therein.

As shown herein, the memory controller is be capable of enqueuing a specified number "N" of memory access commands ("N" being a positive whole number). Also, to avoid overwriting the memory controller command queue, there may not be more than N outstanding memory access commands issued by the graphics controller. An outstanding memory access command is one which, from the perspective of the graphics controller (e.g., logic element 141 of FIG. 1), has not been completed. For example, an outstanding memory read command is a read command for which the graphics controller has not received the requested data and an outstanding memory write command is a write command for which the corresponding data has not yet been transferred from the graphics controller to the memory controller. As discussed below, in one embodiment of the present invention, the memory controller signals the graphics controller to transfer the write data when the corresponding write command is received in the AGP command reordering logic 230 of the memory controller.

The foregoing constraints have implications for the AGP command interface 220. For example, because there is no restriction on the number of successive write or read commands that may be received via the AGP command path 205, the write command queue 310 is capable of holding N write commands and read command queue 320 is capable of holding N read commands. Also, because there can be no more than N outstanding memory access commands, it is not possible for one of the write command queue 310 or read command queue 320 to enqueue a memory access command, without the other queue also having an available entry. Because the write and read command queues 310 and 320 are each at least size N, it follows that the one of the write and read command queues 310 and 320 must be capable of enqueuing at least one additional value.

Queue advance logic 330 receives write queue and read queue advance signals from AGP command reordering logic 230 and advances the queue head (Q-HEAD) pointer to point to the next entry in the write command queue 310 and read command queue 320, respectively. The effect of advancing Q-HEAD pointer in either the read command queue 320 or the write command queue 310 is to dequeue the entry previously pointed at by that Q-HEAD pointer. It will be appreciated that by adjusting Q-HEAD and Q-TAIL pointers to respectively dequeue and enqueue commands in the write and read command queues 310 and 320, the queued commands themselves do not have to be moved from entry to entry to pass through the queue. Instead, only Q-HEAD and Q-TAIL pointers need be adjusted to implement the first-in, first-out (FIFO) operation of the queue. When the Q-HEAD or Q-TAIL pointers reaches a first or last entry (or storage location) in the N-sized memory element used to implement the queue, this particular pointer is wrapped around to the other end of the N-sized memory element. In other words, according to one embodiment of the present invention, write command queue 310 and read command queue 320 are implemented by way of a circular queue in which the final entry is considered to be logically adjacent to the first entry.

It will be appreciated that other embodiments of the write command queue 310 and the read command queue 320 are possible. For example, once enqueued, memory access commands could be shifted from entry to entry until finally reaching a head entry from which they are output to the AGP command reordering logic 230. In such an implementation, the location of Q-HEAD is static so that a queue head pointer is not required. Other FIFO buffer arrangements may be used to implement the write command queue 310 and read command queue 320 without departing from the spirit and scope of the present invention.

Figure 3B:
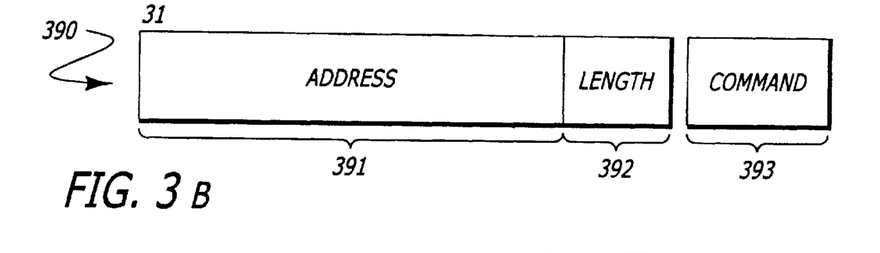
FIG. 3B is an illustrative embodiment of an AGP bus request from which various types of AGP commands can be detected.

As described above, AGP command decode logic 300 includes logic circuitry which detects when an AGP command is a flush command. In this illustrative embodiment, the AGP command decode logic 300 checks a number of bits of an AGP bus request to determine the command type. Of course, other detection mechanisms may be used. As shown in FIG. 3B, the AGP bus request 390 features an address 391, a first field 392 and a second field 393, all of which having a modifiable bit size depending on a chosen system architecture. The address 391 indicates the targeted destination of the bus request. The first field 392 represents the access length in quad-words while the second field 393 represents the type of AGP command associated with the AGP bus request 390. The second field 393 is sized with a sufficient bit width to handle multiple types of AGP commands including a flush command. Of course, the contents of the address 391 and first field 392 are not utilized if the AGP command is a flush command since such information is not necessary.

Referring back to FIG. 3A, upon the AGP command decode logic 300 detecting a flush command, it is enqueued in the read command queue 310 along with a synchronization value enqueued in the write command queue 320. If more than two queues are utilized, multiple synchronization values are enqueued. For clarity sake, the description focuses on a single read and write queue.

Referring still to FIG. 3A, AGP command reordering logic 230 includes dequeue logic 340, write allocation logic 345, write buffer 350, write arbitration logic 355, read allocation logic 360, read buffer 365, read arbitration logic 370 and command arbitration logic 375.

Write allocation logic 345 is coupled to write buffer 350 via communication line 346 in order to forward write commands received from write command queue 310 via communication line 311. According to one embodiment of the present invention, write allocation logic 345 outputs at least two signals via communication lines 347–348 to dequeue logic 340 based on the state of the write buffer 350. If write buffer 350 has storage available to receive a write command, write allocation logic 345 asserts a request (REQ) over communication line 347. If write buffer 350 has been completely emptied (i.e., all write commands previously stored therein have been ordered for execution by command arbitration write logic 375), allocation logic 345 asserts an EMPTY signal through communication line 348.

According to one embodiment of the present invention, when a write command is stored in write buffer 350, data retrieval logic (not shown) within AGP command reordering logic 230 signals the graphics controller (e.g., element 141 of FIG. 1) that the data corresponding to the write command is required. Write arbitration logic 355 determines when data corresponding to a given write command has been received and arbitrates among ready write commands to be forwarded to command arbitration logic 375.

As discussed above, write commands can generally be executed out of order with respect to one another except that a write command cannot be reordered for execution ahead of a write command referencing the same memory address. Write buffer 350 is in queue format to emphasize this restriction on the otherwise free reordering of write commands. Write arbitration logic 355 includes logic to implement the above described reordering restriction and also to select from among two or more ready write commands based on certain optimization criteria (e.g., page hit optimization). In an alternative embodiment of the present invention, memory write commands may not be reordered relative to one another, and instead may only be reordered relative to memory read commands.

Read allocation logic 360 forwards read commands received from read command queue 320 via communication line 321 to available entries in read buffer 365. According to one embodiment of the present invention, read allocation logic 360 is capable of asserting one of at least two signals to dequeue logic 340: a request (REQ) signal via communication line 361 to indicate that read buffer 365 has one or more available entries, and an EMPTY signal via communication line 362 to indicate that read buffer 365 has been completely emptied (i.e., all read commands previously stored in read buffer 365 have been issued for execution by command arbitration logic 375).

In accordance with the relaxed memory access protocol, there is no restriction on the reordering of read commands relative to one another so that read arbitration logic 370 selects from read commands in read buffer 365 according to optimization criteria (e.g., page hit optimization).

Command arbitration logic 375 arbitrates between write commands received from write arbitration logic 355 and read commands received from read arbitration logic 370 according to certain optimization criteria. Command arbitration logic 375 outputs control signals to memory access logic 240 according to the selected write or read command. From the perspective of the AGP command interface 220 and the AGP reordering logic 230, once control signals corresponding to a selected write or read command have been output by command arbitration logic 375, the selected write or read command is considered to be completed or visible, provided a read still require data to be returned.

Figure 4:
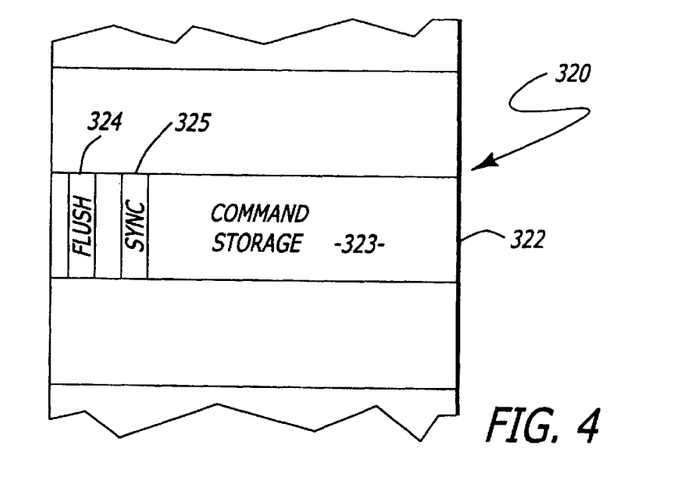
FIG. 4 is an illustrative embodiment of an entry of the read command queue implemented within the AGP command interface.

FIG. 4 depicts the structure of an entry 322 of a read command queue 320 according to one embodiment of the present invention. As shown, read command queue entry 322 includes at least a command storage field 323 to store a memory read command and a flush modifier field 324 to identify that the command is a flush command. Additionally, it is appreciated that the read command queue 320 and the write command queue 310 may include entries having a similar structure including a synchronization (sync) field 325 as shown through dashed lines. For the write command queue 310, the sync field is used to indicate whether the value in command storage is a valid write command or the overall entry is a synchronization value. The exact number of bits allocated to the command storage field and the sync and/or flush fields may be altered without departing from the spirit and scope of the present invention. Further, these sync and flush indicators may even be maintained separately from the write and read command queues 310 and 320 so long as the indicators can be associated with entries in these command queues.

Figure 5:
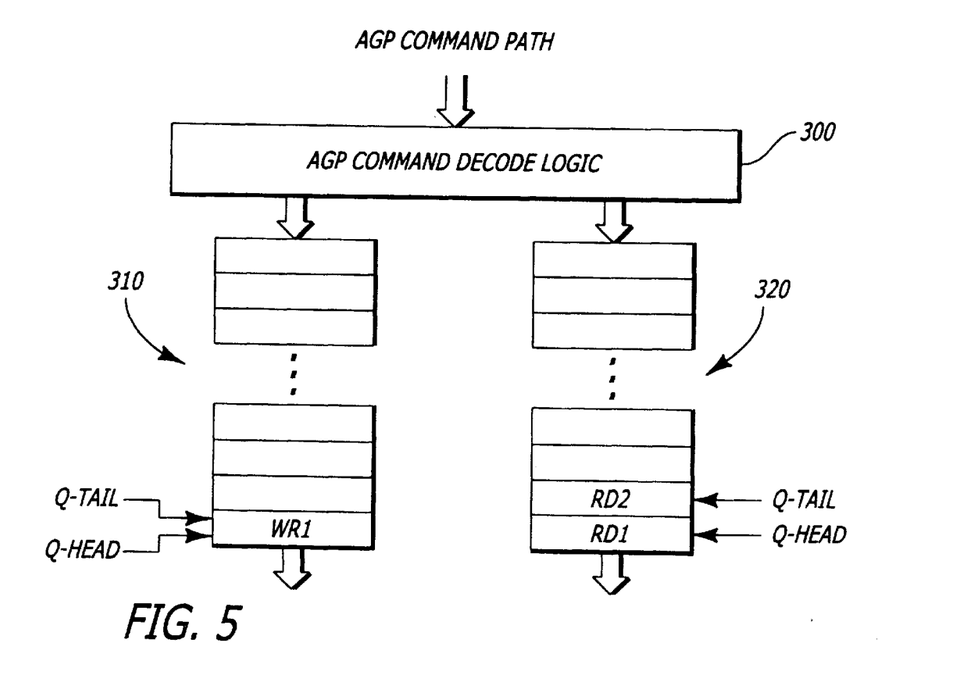
FIG. 5 is an illustrative block diagram of write and read command queues after receiving a first exemplary sequence of commands.

Referring to FIGS. 5–11, a series of illustrative block diagrams are used to depict the state of the write and read command queues 310 and 320 and operations of the memory controller after exemplary sequences of memory access commands. FIG. 5 depicts the state of the write and read command queues after the following a first exemplary sequence of memory access commands have been received and before the commands have been dequeued into the AGP command reordering logic:

Sequence 1: RD1, WR1, RD2(RD2 being received last)

As shown in FIG. 5, the write command WR1 has been enqueued in write command queue 310, and the two read commands, RD1 and RD2, have been enqueued in read command queue 320. As described for FIG. 3A, the write and read command Q-TAILS pointers are configured to point at entries in their respective queues to which the most recent memory access command has been written. Because, at this point, WR1 is the only command enqueued in the write command queue 310, the head and tail pointers for the write command queue 310 point to the same entry. It will be appreciated that, in an alternative embodiment, the Q-TAIL could point to the next vacant entry in the queue instead of the most recently filled location.

Figure 6:
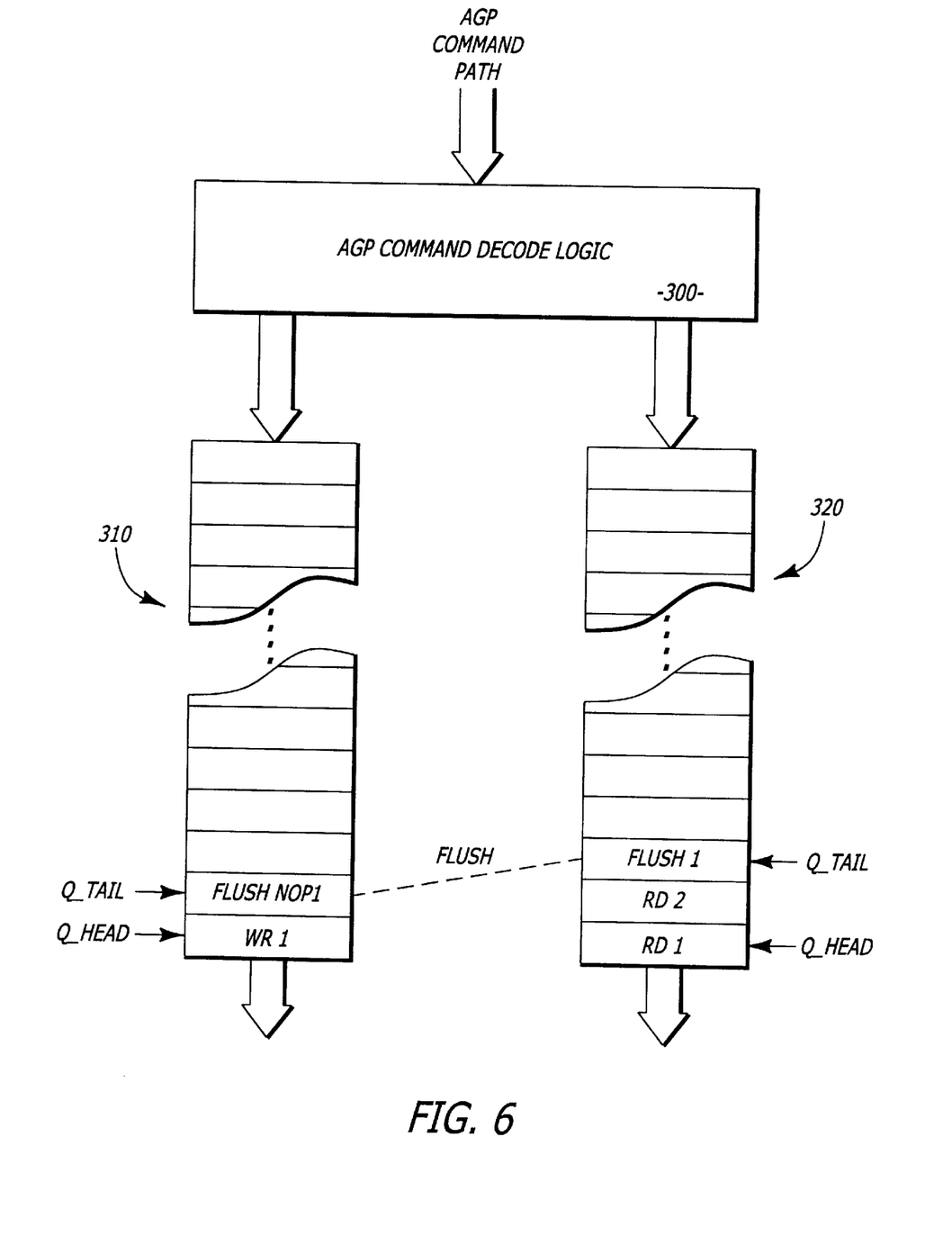
FIG. 6 is an illustrative block diagram of the write and read command queues of FIG. 5 after receiving a second exemplary sequence of commands including a first flush command.

FIG. 6 depicts the state of the write and read command queues 310 and 320 after a second exemplary sequence of commands is received in the AGP command decode logic 300 and before WR1, RD1 or RD2 have been dequeued. The second sequence is the following:

Sequence 2: FLUSH

As described above, when a flush command is received in the AGP command decode logic 300, the flush command is detected and enqueued in read command queue 320. A corresponding synchronization value (token) is placed in write command queue 310. The enqueued synchronization value is labeled "FLUSH NOP1" to reflect that one embodiment of a synchronization value may include an invalid command or no-operation (NOP). This is accomplished through assertion of a particular sync bit in that entry of write command queue 310 assigned with the synchronization value.

As described below, the entries in the read and write command queues 320 and 310 containing the flush command (FLUSH1) and FLUSH NOP1, define a demarcation as to which commands are issued before dequeuing the FLUSH command. This is signified in FIG. 5 by the dashed line labeled "FLUSH" extending between FLUSH1 and FLUSH NOP1 queue entries.

Figure 7:
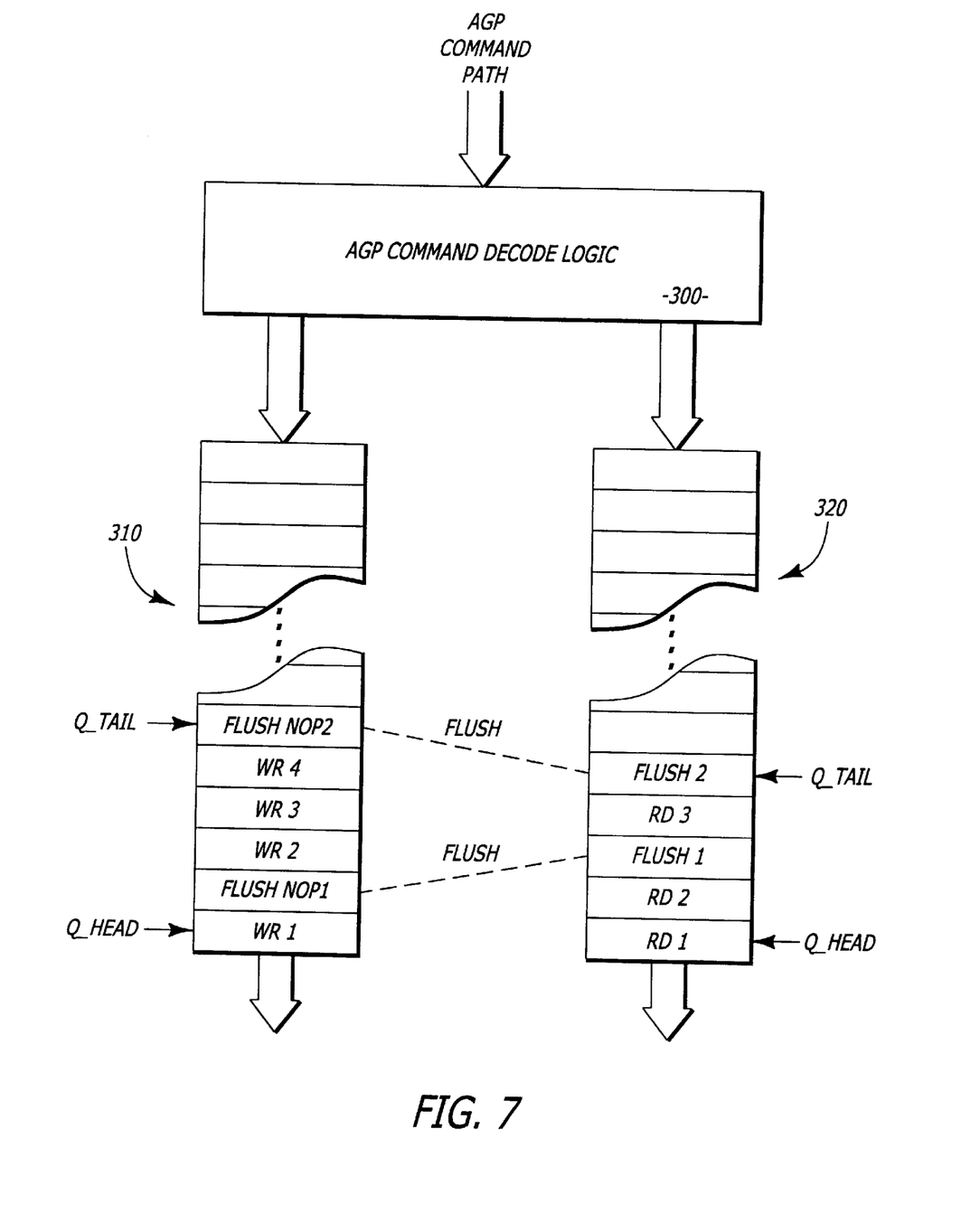
FIG. 7 is an illustrative block diagram of the write and read command queues of FIG. 6 after receiving a third exemplary sequence of commands including a second flush command.

FIG. 7 depicts the state of the write and read command queues 310 and 320 after the following third exemplary sequence of commands is received in the AGP command decode logic 300 and before the commands received in the first and second exemplary command sequences have been dequeued:

Sequence 3: WR2, WR3, RD3, WR4, FLUSH

It will be appreciated that command dequeuing may occur concurrently with command enqueuing so that it is likely that commands received in the first exemplary command sequence would likely have been dequeued by the time the third exemplary command sequence is received. Assuming that the commands of the first exemplary command sequence have not yet been dequeued is nonetheless helpful for understanding the manner in which commands are enqueued in the write and read command queues 310 and 320.

As shown in FIG. 7, read command RD3 is enqueued in the read command queue 320 behind the first flush command FLUSH1. Likewise write commands WR2, WR3 and WR4 are enqueued in the write command queue 310 behind synchronization value FLUSH NOP1. As indicated in the third exemplary command sequence, another flush command (FLUSH2) following WR4 is loaded into read command queue 320 after receipt by AGP command decode logic 300. Consequently, another synchronization value designated "FLUSH NOP2" is enqueued in write command queue 310 either concurrently with or immediately after enqueuing FLUSH2. A dashed line labeled "FLUSH" is shown extending between FLUSH NOP2 and FLUSH2 to indicate that commands preceding FLUSH2 must be visible before FLUSH2 dequeued.

Figure 8:
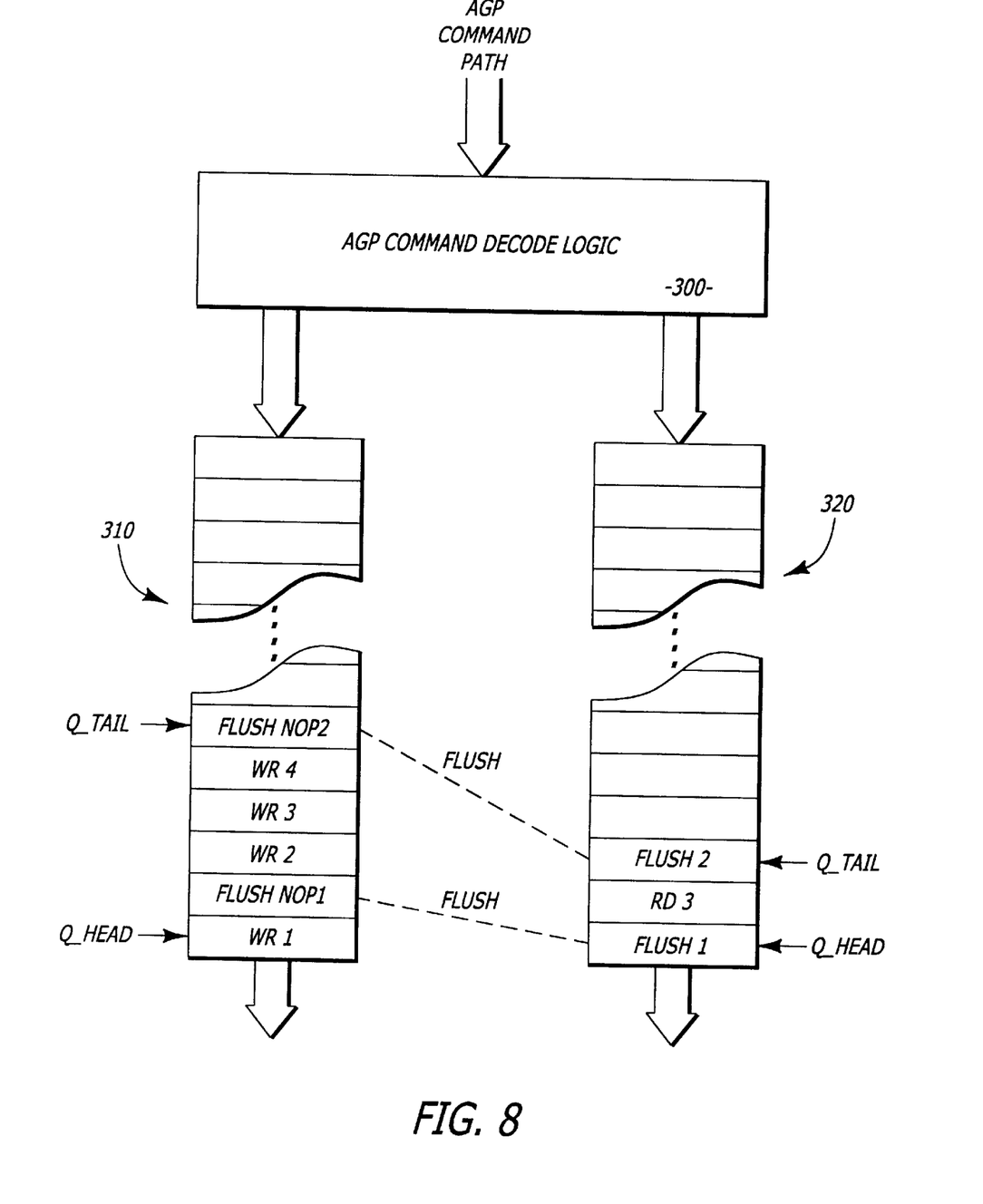
FIG. 8 is an illustrative block diagram of the write and read command queues of FIG. 7 after the first exemplary sequence of commands has been dequeued.

FIG. 8 depicts the state of the write and read command queues 310 and 320 after read commands RD1 and RD2 have been dequeued. At this point, the flush command FLUSH1 is present at the head of the read command queue 320, but the corresponding synchronization value FLUSH NOP1 has not yet advanced to the head of the write command queue 310. According to one embodiment of the present invention, a flush command cannot be dequeued from the read command queue 320 unless the following two conditions are satisfied:

1. A synchronization value, corresponding the flush command enqueued in the read command queue, has advanced to the head of the write command queue.
2. All memory access commands previously dequeued into the AGP command reordering logic have been issued for execution into the memory access logic.

As shown in FIG. 8, the first condition set forth above requires that the flush command FLUSH1 be delayed or blocked from being dequeued at least until the write command WR1 is dequeued and the synchronization value FLUSH NOP1 is advanced to the head of write command queue 310. The effectiveness of the synchronization value FLUSH NOP1 can now be appreciated. The synchronization value indicates which commands from the write command queue must have been dequeued and routed into the AGP command reordering logic (element 230 of FIG. 3). As a result, these write commands will be visible to agents within the electronic system before the memory access logic will return a quad-word in response to the FLUSH1.

Figure 9:
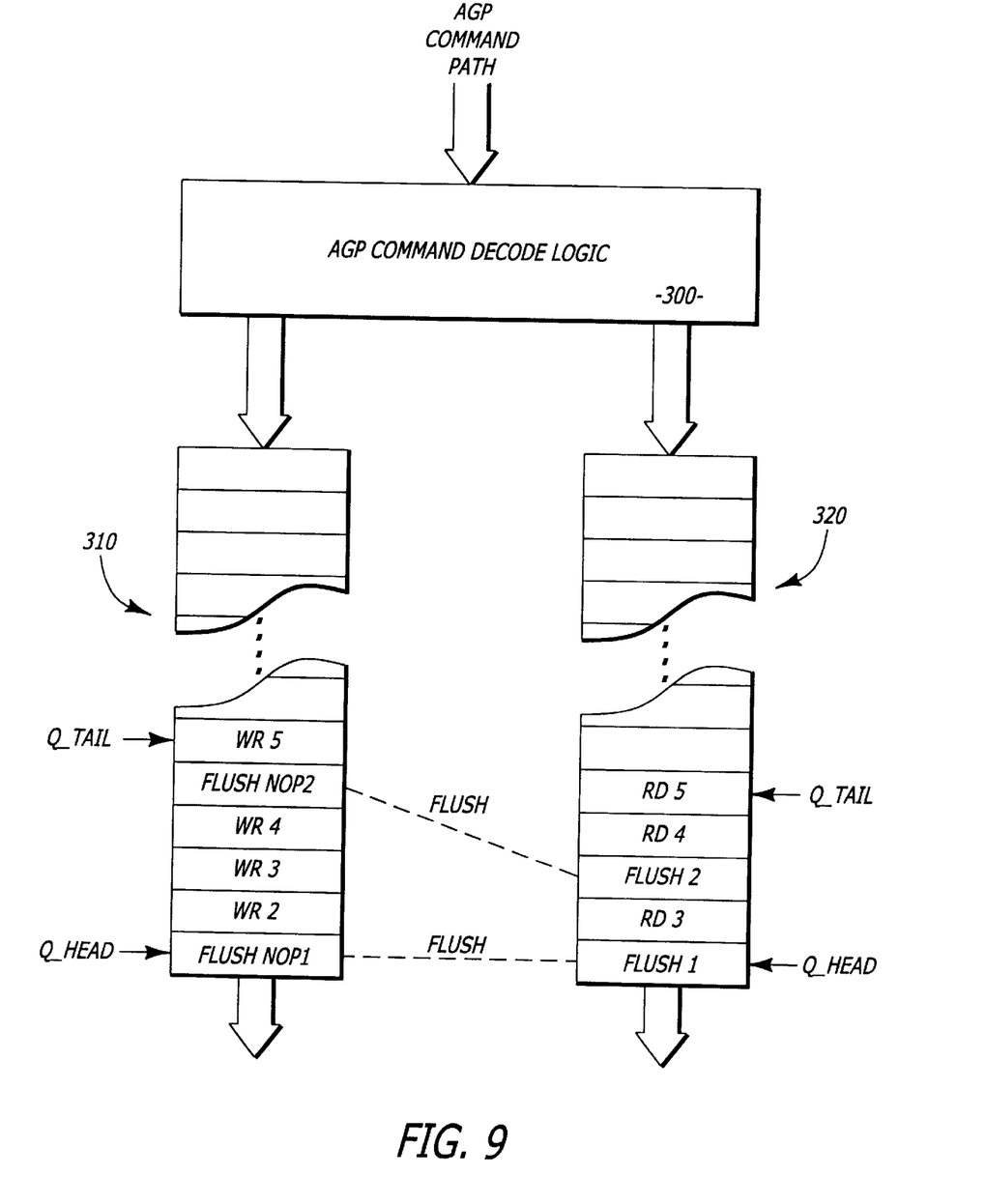
FIG. 9 is an illustrative block diagram of write and read command queues having a first synchronization value and the first flush command at their respective heads.

FIG. 9 depicts the state of the write and read command queues 310 and 320 after the write command WR1 has been dequeued from the write command queue 310. After condition two (set forth above) for dequeuing the flush command is satisfied, it may be dequeued. As shown, additional memory access commands WR5, RD4 and RD5 have been received since the time at which the write and read command queues 310 and 320 were in the state depicted in FIG. 8.

According to one embodiment of the present invention, FLUSH1 and synchronization value FLUSH NOP1 are dequeued concurrently. However, write buffer allocation logic (element 345 of FIG. 3A) in the AGP command reordering logic (element 230 of FIG. 3A) does not buffer the synchronization value for execution. This causes the AGP command reordering logic 230 of FIG. 3A to process the flush command (FLUSH1) and produce a particular control signal to memory access logic 240 of FIG. 3A. The memory access logic detects the flush command and returns an acknowledge signal through the AGP interface in lieu of accessing main memory. As a result, memory access logic would be able to suppress error condition and warning operations from occurring. Upon receiving the acknowledge signal (e.g., a single quad-word of random data), the graphics controller or any other agent would recognize that the results of all previous commands are visible.

Figure 10:
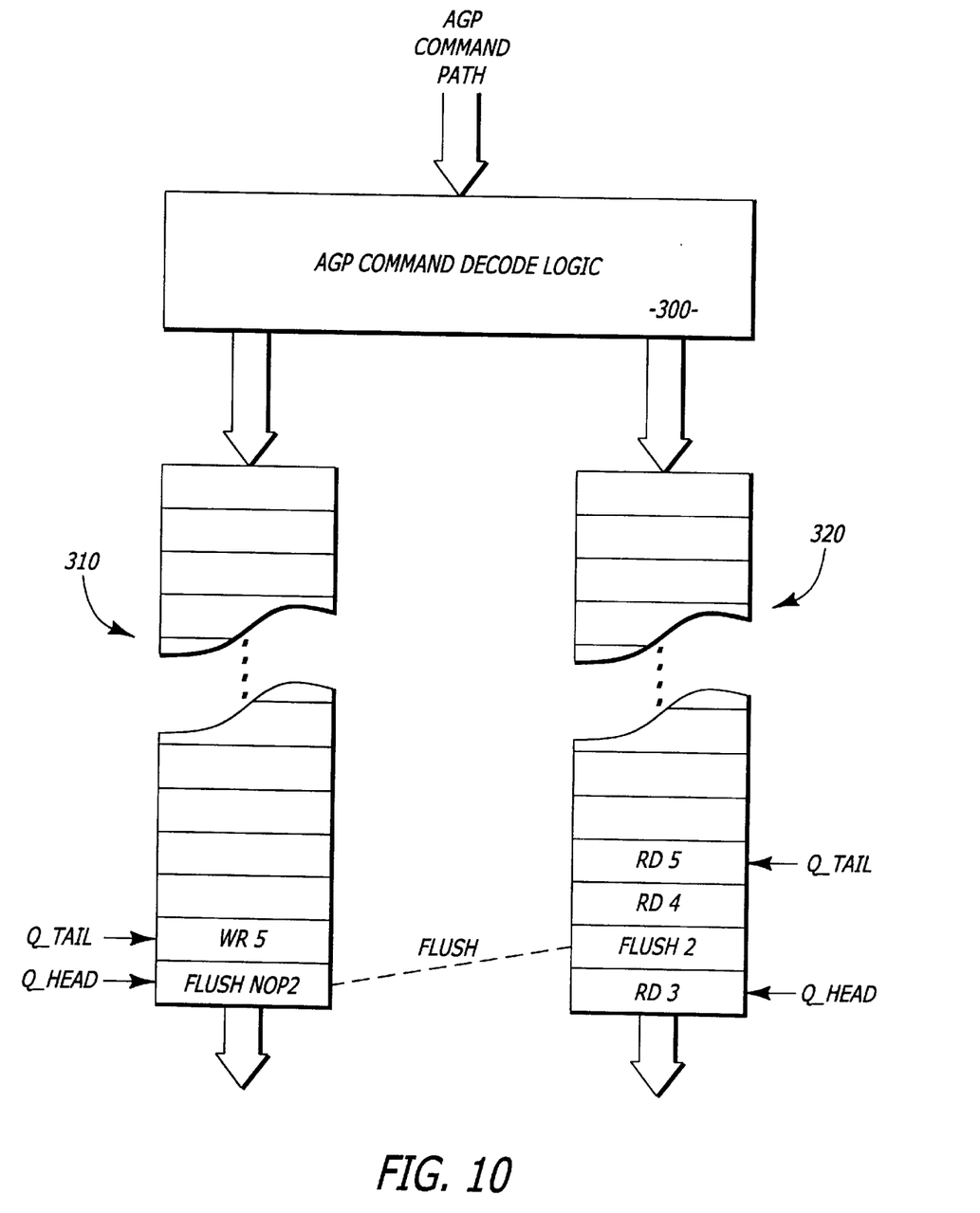
FIG. 10 is an illustrative block diagram of write and read command queues having a synchronization value and an executable command their respective heads.

FIG. 10 depicts the state of the write and read command queues 310 and 320 after the synchronization value FLUSH NOP1, FLUSH1, and write commands WR2, WR3 and WR4 have been dequeued. At this point, the synchronization value FLUSH NOP2 appears at the head of the write command queue 310 but is not dequeued until FLUSH2 appears at the head of read command queue 320. In other words, regardless of whether a flush command or the corresponding synchronization value first reaches the head of its respective queue, neither can be dequeued until the other also reaches the head of its queue.

Figure 11:
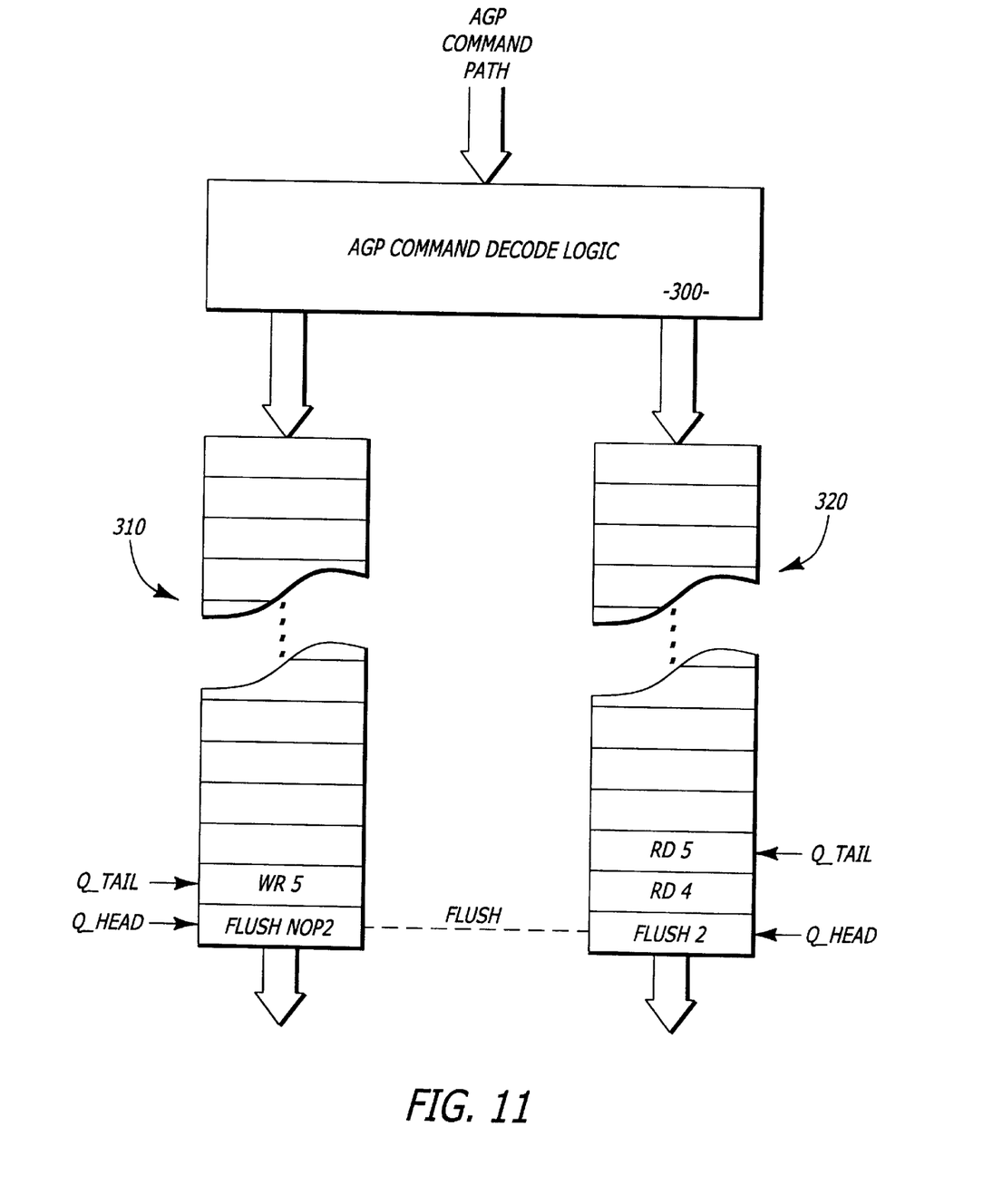
FIG. 11 is an illustrative block diagram of write and read command queues having the second flush command and a second synchronization value at their respective heads.

FIG. 11 depicts the state of the write and read command queues 310 and 320 after the flush command FLUSH2 has advanced to the head of the read command queue 320. Once it is determined that the previously dequeued memory access commands have been flushed from the AGP command reordering logic (e.g., element 230 of FIG. 3A), the flush command FLUSH2 and the synchronization value FLUSH NOP2 may both be dequeued.

In view of the foregoing, the invention has been described with reference to specific exemplary embodiments thereof. It is contemplated, however, that both the flush command and a fence command can be supported with a similar architecture. A "fence command" is a mechanism that ensures that a given memory access command is not reordered for execution ahead of memory access commands previously issued by an agent such as a graphics controller. Instead of enqueuing fence commands in a read or write command queue within the memory controller, one embodiment for a fence command is to set a flag upon receipt of the fence command. The flag is reset upon receipt of the next memory access command and the memory access command is enqueued together with an indication that the memory access command succeeded the fence command. In this way, the fence is indicated without dedicating an entire queue entry to the fence command. In the event that the memory controller contains multiple command queues, a synchronization value is enqueued in each of the other command queue(s) to prevent enqueue commands from being reordered for processing before the fence command through dequeue delay techniques identified in FIGS. 5–11.

It will be evident that various modifications and changes may be made to the present invention without departing from the broader spirit and scope of the invention as set forth in the appended claims. The specification and drawings are, accordingly to be regarded in an illustrative rather than a restrictive sense.

What is claimed is:

1. A method comprising:
   queuing a flush command in a first queue;
   queuing a synchronization value in a second queue; and
   delaying the flush command from being dequeued from the first queue until both the flush command is advanced to a head of the first queue and the synchronization value is advanced to a head of the second queue.

2. The method of claim 1 further comprising delaying the synchronization value from being dequeued from the second queue until the flush command is advanced to the head of the first queue.

3. The method of claim 1 further comprising delaying the flush command from being dequeued from the first queue until at least one executable command, enqueued in the second queue prior to receiving the flush command, has been dequeued from the second queue.

4. The method of claim 1 further comprising delaying the flush command from being dequeued from the first queue until at least one executable command, enqueued in the first queue prior to receiving the flush command, has been dequeued from the first queue.

5. The method of claim 1 further comprising concurrently dequeuing the flush command and the synchronization value from the first queue and the second queue, respectively.

6. The method of claim 1 further comprising: producing a control signal upon dequeuing the flush command; and transferring the control signal to a memory access logic.

7. The method of claim 6 further comprising: producing an acknowledge signal upon detecting the control signal; and precluding access to a main memory.

8. The method of claim 1, wherein the synchronization value includes an invalid command.

9. The method of claim 1, wherein the synchronization value includes a no-operation command.

10. A system comprising:
    a memory;
    a graphics controller; and
    a chipset coupled to both the memory and the graphics controller, the chipset including a memory controller that comprises:
    a command interface including a plurality of queues including a first queue adapted to enqueue the flush command and a second queue adapted to enqueue a synchronization value that includes a no-operation command processed in coordination with the flush command, and a queue advance circuit adapted to delay the flush command from being dequeued from the first queue until the synchronization value is advanced to a head of the second queue.

11. The system of claim 10, wherein the first queue of the command interface is a read command queue.

12. The system of claim 11, wherein the second queue of the command interface is a write command queue.

13. The system of claim 10, wherein the memory controller of the chipset further comprises a command reordering logic coupled to the command interface, the command reordering logic reorders the flush command for execution and conversion to a control signal according to a selected optimization strategy.

14. The system of claim 13, wherein the memory controller of the chipset further comprises a memory access logic coupled to the command reordering logic, the memory access logic produces an acknowledge signal upon receiving the control signal in lieu of accessing the memory and returns the acknowledge signal to the graphics controller.

15. The system of claim 14, wherein the synchronization value is provided through assertion of a synchronization bit in an entry of the second queue.

16. A system comprising:

a memory;

a graphics controller; and a chipset coupled between the memory and the graphics controller, the chipset including a memory controller to ensure data coherency through a flush command and to prevent reordering of a first memory access command ahead of a second memory access command previously issued by the graphics controller, the memory controller having a command interface including:

a first queue to enqueue the flush command, a second queue to enqueue a synchronization value, and a queue advance circuit to delay the flush command from being dequeued from the first queue until the synchronization value is advanced to a head of the second queue and the flush command is advanced to a head of the first queue.

17. The system of claim 16, wherein the synchronization value enqueued in the second queue is a no-operation command processed in coordination with the flush command.

18. The system of claim 17, wherein the first queue includes a read command queue.

19. The system of claim 18, wherein the second queue includes a write command queue.

20. The system of claim 17, wherein the memory controller further includes a command reordering logic coupled to the command interface, the command reordering logic to reorder the flush command for execution and conversion to a control signal according to a selected optimization strategy.

21. The system of claim 20, wherein the memory controller further comprises a memory access logic coupled to the command reordering logic, the memory access logic to produce an acknowledge signal upon receiving the control signal in lieu of accessing the memory and to return the acknowledge signal to the graphics controller.

22. The system of claim 21, wherein the memory controller further comprising a data buffer coupled to the memory access logic.

* * * * *